United States Patent Office 3,476,779
Patented Nov. 4, 1969

3,476,779
NOVEL STEROID COMPOUNDS OF THE CHOLESTANE SERIES
Claude Vezina, Oka, Quebec, and Romano Deghenghi, Montreal, Quebec, Canada, assignors to American Home Products Corporation, New York, N.Y., a corporation of Delaware
No Drawing. Original application May 13, 1965, Ser. No. 455,578. Divided and this application Oct. 17, 1967, Ser. No. 675,791
Int. Cl. C07c *169/50, 167/18, 169/08*
U.S. Cl. 260—397.2           7 Claims

ABSTRACT OF THE DISCLOSURE

The new steroid compounds cholesta-3,7-diene-3β,19-diol diacetate, 19-hydroxycholesta-4,7-dien-3-one, 3,19-diacetoxycholesta-3,5,7 - triene, 10 - acetoxycholesta-4,7-dien-3-one, 19-hydroxycholesta-5,7-dien-3-one, 17β-[2'-(6'-methylheptyl)]-estra-5(10),7-dien - 3 - one, 19-nor-cholesta-4,7-dien-3-one and procedures for their preparation as well as their conversion into the valuable steroid compound equilin are herein disclosed.

---

This application is a division of our copending patent application, Ser. No. 455,578, filed May 13, 1965, now U.S. Patent No. 3,395,078.

This invention relates to novel steroid compounds which may be prepared from the starting material cholest-5-ene-3β,19-diol diacetate.

In the prepartion of equilin, a well known steroid having estrogenic properties, our synthesis, as described in said copending application, Ser. No. 455,578, starts with the compound cholest-5-ene-3β,19-diol diacetate. This starting material and a method for preparing it are described in the article by J. Kalvoda et al. published in the Helv. Chim. Acta., vol. 46, page 1361 (1963).

In our process for the preparation of equilin as described in said copending patent application, of which this application is a division, the last step comprises a microbiological conversion in which equilin is prepared by the enzymatic activity of microorganisms of the group *Bacterium cyclooxidans, Mycobacterium rhodochrus, Corynebacterium simplex* and *Nocardia corallina*. In the preliminary chemical synthesis steps which precede this microbiological conversion, starting with the compound cholest-5-ene-3β-19-diol diacetate, various new chemical compounds are prepared. This invention is directed to these new chemical compounds which include cholesta-5,7-diene-3β,19-diol diacetate, 19-hydroxycholesta-4,7-dien-3-one, 3,19-diacetoxycholesta-3,5,7-triene, 10-acetoxycholesta - 4,7 - dien-3-one, 19-hydroxy-cholesta-5,7-dien-3-one, 17β-[2'-(6' - methylheptyl)]-estra - 5(10),7-dien-3-one and 19-norcholesta-4,7-dien-3-one.

In preparing the new chemical compounds to which this invention is directed, cholest-5-ene-3β,19-diol diacetate is treated with N-bromosuccinimide in an inert organic solvent such as carbon tetrachloride. The mixture is refluxed and irradiated for five minutes with the light of a photoflood lamp. The reaction mixture is filtered, and the filtrate evaporated at reduced pressure less than atmospheric. This novel compound cholesta-5,7-diene-3β,19-diol diacetate is then recovered, in an amorphous form, by recovery steps which are more fully set forth in the illustrative examples which follow.

By hydrolysis of cholesta-5,7-diene-3β,19-diol diacetate, by overnight treatment at room temperature with alcoholic potassium hydroxide, followed by subjecting the corresponding diol to conventional Oppenauer oxidation, the new compound 19-hydroxycholesta-4,7-dien-3-one is secured. This may be acetylated with pyridine and acetic anhydride at room temperature, thereby resulting in the corresponding acetate, 19 - acetoxycholesta - 4,7-dien-3-one.

This last-named new compound may then be dissolved in acetic anhydride and refluxed for one hour in the presence of a catalytic amount of p-toluenesulfonic acid. Extraction with ether, followed by washing to neutrality and evaporation off of the solvent, results in the new chemical compound, the enol diacetate, 3,19-diacetoxycholesta-3,5,7-triene.

When cholesta-4,7-dien-3-on-19-ol (also named 19-hydroxycholesta-4,7-dien-3-one, Example 2) is refluxed in the presence of lead tetraacetate dispersed in toluene and under a non-oxidizing, i.e. nitrogen, atmosphere, there is obtained, upon evaporation of the solvent, another new steroid compound. This is the compound 10-acetoxycholesta-4,7-dien-3-one.

It is also possible to prepare another new steroid compound, 19-hydroxycholesta-5,7-dien-3-one, by treatment of 19-hydroxycholesta-4,7-dien-3-one (Example 2) dissolved in dimethylsulfoxide with sodium methoxide. This reaction is carried out under an inert atmosphere of nitrogen gas and at room temperature. When the reaction mixture is quenched with aqueous acetic acid and extracted with ether, there is obtained 19-hydroxycholesta-5,7-dien-3-one.

In another experiment, cholesta-4,7-diene-3-on-19-ol may be treated with zinc dust in glacial acetic acid. The reaction mixture is then filtered, diluted with water and extracted with ether. This is followed by washing to neutrality and evaporating the solvent. There is thus obtained the new steroid compound 17β-[2'-(6'-methylheptyl)]-estra-5(10),7-dien-3-one.

When the last-named compound is stirred at room temperature with a methanolic solution of hydrochloric acid, which solution is then diluted with water, there is obtained the compound 19-norcholesta-4,7-dien-3-one. This may be recovered by extracting the reaction mixture with ether, washing to neutrality and evaporating off the solvent.

The same compound is also secured by utilizing in place of methanolic hydrogen chloride a solution of potassium hydroxide in methanol. The new compound 19-norcholesta-4,7-dien-3-one is thus obtained upon treatment of 17β-[2'-(6'-methylheptyl)]-estra-5(10),7-dien-3-one under acid or alkaline conditions.

As more particularly disclosed and claimed in our copending application, Ser. No. 455,578, all of these compounds may be readily converted to equilin by utilizing the enzymatic activity of a microorganism such as *Bacterium cyclooxidans, Mycobacterium rhodochrus, Corynebacterium simplex* and *Nocardia corallina*. Details of this procedure are given in the illustrative examples.

The reactions herein described and the steroid compounds obtained are schematically represented on the flow sheet in which Ac represents the acetyl group.

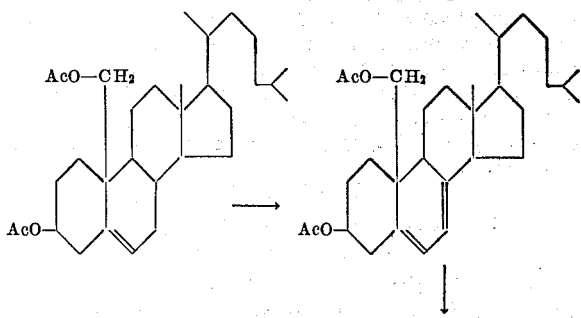

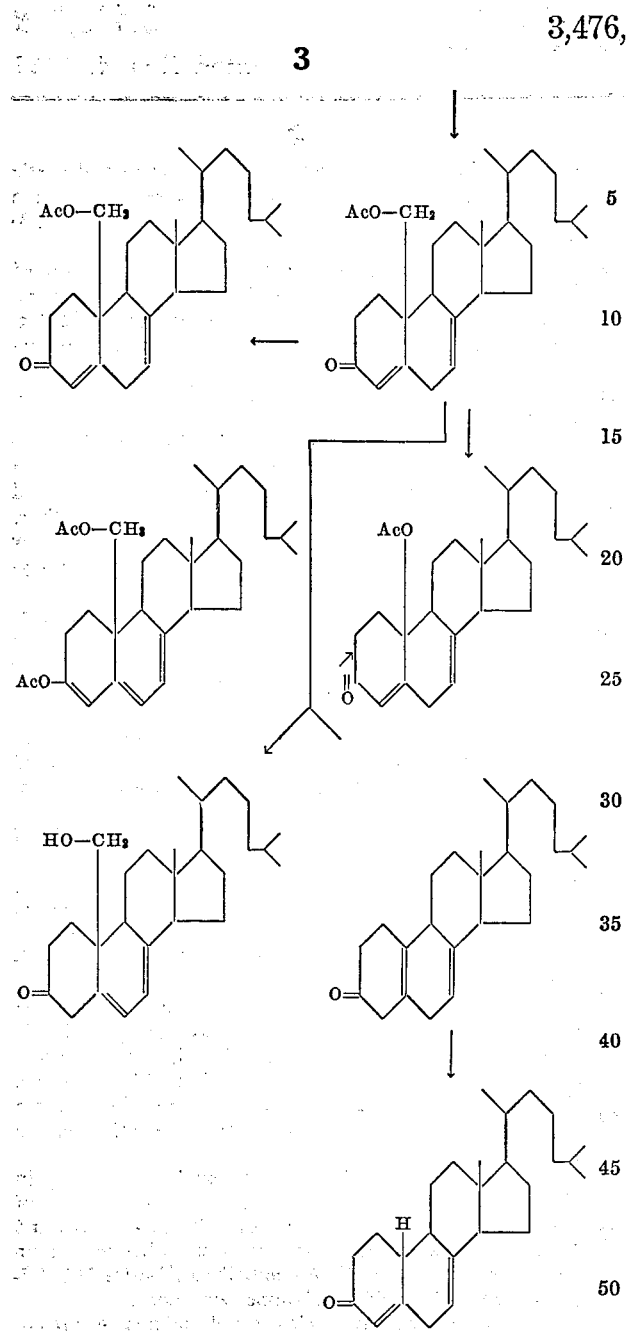

EXAMPLE 1

Cholesta-5,7-diene-3β,19-diol diacetate

A mixture of 0.01 M quantity of cholest-5-ene-3β,19-diol diacetate (J. Kalvoda et al., Helv. Chim. Acta. 46, 1361, (1963) and 2.15 g. of N-bromosuccinimide in 100 ml. of carbon tetrachloride is refluxed and irradiated for 5 minutes (photoflood lamp, 500 w.). The cooled mixture is filtered and the filtrate evaporated at a reduced pressure less than atmospheric. Collidine (10 ml.) and xylene (50 ml.) are added to the residue and refluxed for 15 minutes. The mixture is taken up in ether, washed to neutrality and the solvent evaporated, yielding an amorphous material from which cholesta-5,7-diene-3β,19-diol diacetate is separated by chromatography on silica gel, the chromatogram being developed with hexane-ethyl acetate mixtures.

EXAMPLE 2

19-hydroxycholesta-4,7-dien-3-one (cholesta-4,7-dien-3-on-19-ol)

Cholesta-5,7-diene-3β,19-diol diacetate, as obtained in Example 1, is hydrolyzed overnight at room temperature in alcoholic potassium hydroxide (5%) and the corresponding diol, cholesta-5,7-diene-3β,19-diol, is subjected to conventional Oppenauer oxidation. Extraction with ether, washing to neutrality, and evaporation of the solvent, followed by chromatography, gives 19-hydroxycholesta-4,7-dien-3-one. This compound is acetylated with pyridine and acetic anhydride at room temperature overnight to give the corresponding acetate, 19-acetoxycholesta-4,7-dien-3-one.

EXAMPLE 3

3,19-diacetoxycholesta-3,5,7-triene 19-acetoxycholesta-4,7-dien-3-one is dissolved in acetic anhydride and refluxed for 1 hour in presence of a catalytic amount of p-toluenesulfonic acid. Extraction with ether, washing to neautrality and evaporation of the solvent followed by chromatography yields the enol diacetate 3,19-diacetoxycholesta-3,5,7-triene.

EXAMPLE 4

10-acetoxycholesta-4,7-dien-3-one

Cholesta-4,7-dien-3-on-10-ol, as prepared in Example 2 (1.0 g.), is refluxed in presence of 3.0 g. of lead tetraacetate under nitrogen in toluene for 5 minutes. Extraction with methylene chloride, washing to neutrality, and evaporation of the solvent yields 10-acetoxycholesta-4,7-dien-3-one.

EXAMPLE 5

19-hydroxycholesta-5,7-dien-3-one

Cholesta-4,7-dien-3-on-19-ol, as prepared by the method of Example 2, is dissolved in dimethyl sulfoxide and treated at room temperature under nitrogen with 3 parts by weight of sodium methoxide. The mixture is quenched with aqueous acetic acid (2.5 ml. in 50 ml. water) and the compound 19-hydroxycholesta-5,7-dien-3-one is recoverd. This is accomplished by extraction with ether, washing the solution to neutrality, drying and evaporating off the solvent.

EXAMPLE 6

17β-[2'-(6'-methylheptyl)]-estra-5(10),7-dien-3-one

Cholesta-4,7-dien-3-on-19-ol, as prepared in Example 2, is stirred at room temperature for 16 hours with an equal weight of zinc dust in glacial acetic acid. Filtration, dilution with water, extraction with ether, washing to neutrality and evaporation off of the solvent yields 17β-[2'-(6'-methylheptyl)]-estra-5(10),7-dien-3-one.

EXAMPLE 7

19-norcholesta-4,7-dien-3-one

17β-[2'-(6'-methylheptyl)]-estra-5(10),7-dien-3-one as obtained in Example 6, is stirred at room temperature in methanolic solution containing hydrochloric acid for 15–30 minutes. Dilution with water, extracting with ether, washing to neutrality and evaporation of the solvent yields 19-norcholesta-4,7-dien-3-one. In the same manner but using 1% potassium hydroxide in methanol instead of methanolic hydrogen chloride, there is also obtained 19-norcholesta-4,7-dien-3-one.

EXAMPLE 8

Equilin

Erlenmeyer flasks (250 ml. size), containing 50 ml. of a conventional medium having pH 6.5 (made up of a commercial glucose preparation, "Cerelose," 20 g.; a protein hydrolysate, "Edamin," 20 g.; corn steep liquor 5 g.; distilled water 1000 ml.) are inoculated with Bacterium cyclooxidans ATCC 12673 and incubated for 42 hours at 25° C. The bacterial culture is centrifuged and resuspended in 0.03 molar phosphate buffer of pH 7.0. A sample of cholesta-5,7-diene-3β,19-diol diacetate, prepared as in Example 1, dissolved in acetone is charged into the culture suspension to a final concentration of 300 μg./ml. and incubated for 1 to 5 days. The bacterial culture is removed by centrifugation, the beer extracted with ethylene dichloride, the extracts dried and evaporated. Chromatography on silica gel yields equilin.

By using the procedure described above, but substituting 19-hydroxycholesta-4,7-dien-3-one,
3,19-diacetoxycholesta-3,5,7-triene,
10-acetoxycholesta-4,7-dien-3-one,
19-hydroxycholesta-5,7-dien-3-one,
17β-[2'-(6'-methylheptyl)]-estra-5(10),7-dien-3-one, or
19-norcholesta-4,7-dien-3-one for cholesta-5,7-diene-3β,19-diol diacetate, and working up in the same manner as described above, equilin is also obtained.

EXAMPLE 9

Equilin

Erlenmeyer flasks (250 ml. size), containing 50 ml. of a conventional medium having pH 6.45 (made up of a commercial glucose preparation, "Cerelose," 20 g.; a protein hydrolysate, "Edamin," 20 g.; corn steep liquor 5 g.; distilled water 1000 ml.) are inoculated with *Mycobacterium rhodochrus* ATCC 4273 and incubated for 42 hours at 25° C. The bacterial culture is centrifuged and resuspended in 0.03 molar phosphate buffer of pH 7.0. A sample of cholesta-5,7-diene-3β,19-diol diacetate, prepared as in Example 1, dissolved in acetone is charged into the culture suspension to a final concentration of 300 μg./ml. and incubated for 2–4 days. The bacterial culture is removed by centrifugation, the beer extracted with ethylene dichloride, the extracts dried and evaporated. Chromatography on silica gel and development with 20% ethyl acetate in carbon tetrachloride yields equilin.

By using the procedure described above, but substituting 19-hydroxycholesta-4,7-dien-3-one,
3,19-diacetoxycholesta-3,5,7-triene,
10-acetoxycholesta-4,7-dien-3-one,
19-hydroxycholesta-5,7-dien-3-one,
17β-[2'-(6'-methylheptyl)]-estra-5(10),7-dien-3-one, or
19-norcholesta-4,7-dien-3-one for cholesta-5,7-diene-3β,19-diol diacetate, and working up in the same manner as described above, equilin is also obtained.

EXAMPLE 10

Equilin

Erlenmeyer flasks (250 ml. size), containing 50 ml. of a conventional medium having pH 6.5 (made up of a commercial glucose preparation, "Cerelose," 20 g.; a protein hydrolysate, "Edamin," 20 g.; corn steep liquor 5 g.; distilled water 1000 ml.) are inoculated with *Corynebacterium simplex* ATCC 6946, and incubated for 42 hours at 25° C. The bacterial culture is centrifuged and resuspended in 0.03 molar phosphate buffer of pH 7.0. A sample of cholesta-5,7-diene-3β,19-diol diacetate, prepared as in Example 1, dissolved in acetone is charged into the culture suspension to a final concentration of 300 μg./ml. and incubated for 2 to 5 days. The bacterial culture is removed by centrifugation, the beer extracted with ethylene dichloride, the extracts dried and evaporated. Chromatography on silica gel and development with 10% collidine in carbon tetrachloride yields equilin.

By using the procedure described above, but substituting 19-hydroxycholesta-4,7-dien-3-one,
3,19-diacetoxycholesta-3,5,7-triene,
10-acetoxycholesta-4,7-dien-3-one,
19-hydroxycholesta-5,7-dien-3-one,
17β-[2'-(6'-methylheptyl)]-estra-5(10),7-dien-3-one, or
19-norcholesta-4,7-dien-3-one for cholesta-5,7-diene-3β,19-diol diacetate, and working up in the same manner, as described above, equilin is also obtained.

EXAMPLE 11

Equilin

Erlenmeyer flasks (250 ml. size), containing 50 ml. of a conventional medium having pH 6.4 (made up of a commercial glucose preparation, "Cerelose," 20 g.; a protein hydrolysate, "Edamin," 20 g.; corn steep liquor 5 g.; distilled water 1000 ml.) are inoculated with *Nocardia corallina* ATCC 999 and incubated for 42 hours at 25° C. The bacterial culture is centrifuged and resuspended in 0.03 molar phosphate buffer of pH 7.0. A sample of cholesta-5,7-diene-3β,19-diol diacetate, prepared as in Example 1, dissolved in acetone is charged into the culture suspension to a final concentration of 300 μg./ml. and incubated for 3 to 5 days. The bacterial culture is removed by centrifugation, the beer extracted with ethylene dichloride, the extracts dried and evaporated. Chromatography on silica gel and development with 15% collidine in carbon tetrachloride yields equilin.

In the same manner, by using a culture of *Nocardia corallina* ATCC 13259, equilin is also obtained.

By using the procedure described above, but substituting 19-hydroxycholesta-4,7-dien-3-one,
3,19-diacetoxycholesta-3,5,7-triene,
10-acetoxycholesta-4,7-dien-3-one,
19-hydroxycholesta-5,7-dien-3-one,
17β-[2'-(6'-methylheptyl)]-estra-5(10),7-diene-3-one, or
19-norcholesta-4,7-dien-3-one for cholesta-5,7-diene-3β,19-diol diacetate, and working up in the same manner as described above, equilin is also obtained.

We claim:
1. Cholesta-5,7-diene-3β,19-diol diacetate.
2. 19-hydroxycholesta-4,7-dien-3-one.
3. 3,19-diacetoxycholesta-3,5,7-triene.
4. 10-acetoxycholesta-4,7-dien-3-one.
5. 19-hydroxycholesta-5,7-dien-3-one.
6. 17β-[2'-(6'-methylheptyl)]-estra-5(10),7-dien-3-one.
7. 19-norcholesta-4,7-dien-3-one.

References Cited

UNITED STATES PATENTS 3,066,154  11/1962  Velluz et al. _____ 260—397.2

OTHER REFERENCES

Velluz et al., Chim. Soc. France, 1957, pp. 1289–1291.
Deghenghi et al., Steroids, September 1967, pp. 313–317.

LEWIS GOTTS, Primary Examiner

E. G. LOVE, Assistant Examiner

U.S. Cl. X.R.

195—51; 204—158; 260—397.4